(12) United States Patent  (10) Patent No.: US 9,236,809 B2
Wang  (45) Date of Patent: Jan. 12, 2016

(54) AUTOMATIC TIMING ADJUSTMENT FOR SYNCHRONOUS RECTIFIER CIRCUIT

(71) Applicant: TEXAS INSTRUMENTS INCORPORATED, Dallas, TX (US)

(72) Inventor: Fan Wang, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 274 days.

(21) Appl. No.: 14/055,173

(22) Filed: Oct. 16, 2013

(65) Prior Publication Data

US 2015/0103563 A1  Apr. 16, 2015

(51) Int. Cl.
 *H02M 3/335* (2006.01)
 *H02M 1/00* (2007.01)

(52) U.S. Cl.
 CPC ...... *H02M 3/33592* (2013.01); *H02M 3/33553* (2013.01); *H02M 2001/0058* (2013.01)

(58) Field of Classification Search
 CPC .................................................. H02M 3/33592
 See application file for complete search history.

(56) References Cited

U.S. PATENT DOCUMENTS

| 4,922,404 | A | * | 5/1990 | Ludwig | ............... | H02M 7/2173 363/127 |
| 6,128,206 | A | * | 10/2000 | Sun | ................... | H02M 3/33592 363/127 |
| 7,633,780 | B2 | * | 12/2009 | Endo | ..................... | H02M 7/217 363/127 |
| 7,796,404 | B2 | * | 9/2010 | Reddy | ............... | H02M 3/33592 363/127 |
| 7,868,597 | B2 | | 1/2011 | Dequina | | |
| 7,888,925 | B2 | | 2/2011 | Dequina | | |
| 7,906,948 | B2 | | 3/2011 | Qiu et al. | | |
| 8,085,083 | B2 | | 12/2011 | Zhang et al. | | |
| 8,299,770 | B2 | | 10/2012 | Qiu et al. | | |
| 8,305,785 | B2 | * | 11/2012 | Nishino | .............. | H02M 1/4225 363/127 |
| 2005/0135127 | A1 | * | 6/2005 | Hamilton | ......... | H02M 3/33592 363/89 |

OTHER PUBLICATIONS

Weiyi Feng, et al., "A Universal Adaptive Driving Scheme for Synchronous Rectification in LLC Resonant Converters", IEEE Transactions on Power Electronics, vol. 27, No. 8, Aug. 2012, pp. 3775-3781.
Brian Acker, et al., "Synchronous Rectification with Adaptive Timing Control", IEEE Publication, Copyright 1995, pp. 88-95.

* cited by examiner

*Primary Examiner* — Emily P Pham
(74) *Attorney, Agent, or Firm* — William B. Kempler; Frank D. Cimino

(57) ABSTRACT

A circuit includes a conduction detector configured to monitor conduction of a body diode of a synchronous rectifier switch relative to a predetermined threshold and to generate a detector output that indicates conduction or non-conduction of the body diode. A window analyzer is configured to generate a timing signal to indicate if the synchronous rectifier switch is turned off prematurely or turned off late relative to an on-time turn off based on the detector output from the conduction detector. A controller is configured to adjust the timing of the synchronous rectifier switch based on whether the timing signal indicates that the synchronous rectifier switch is turned off prematurely or turned off late relative to the on-time turn off.

20 Claims, 5 Drawing Sheets

AUTOMATIC TIMING ADJUSTMENT FOR SYNCHRONOUS RECTIFIER CIRCUIT

TECHNICAL FIELD

This disclosure relates to synchronous rectifier circuits, and more particularly to a synchronous rectifier circuit that senses body diode conduction for making timing adjustments to control a synchronous rectifier circuit.

BACKGROUND

Synchronous rectification is a technique for improving the efficiency of rectification by replacing diodes with actively controlled switches such as transistors, usually power metal oxide semiconductor field effect transistors (MOSFETs). Replacing a diode with an actively controlled switching element such as a MOSFET is at the core of active rectification. The MOSFETs have a constant very low resistance when conducting, known as on-resistance RDS (on). They can be made with an on-resistance as low as about 10 mΩ or even lower. The voltage drop across the MOSFET is then much lower than a diode, which results in a reduction in power loss and a gain in efficiency. At high currents, however, the drop can exceed that of a diode. To accommodate the increase in drop at high currents, several transistors can be placed in parallel, thereby reducing the current through each transistor, or by using a transistor device with more active area.

The control circuitry for active rectification circuits sense the voltage of the input AC and control the transistors to allow current to flow in the correct direction for AC to DC conversion. The timing is important, as timing errors can cause a short circuit as well as reduce the overall efficiency of the power converter.

SUMMARY

This disclosure relates to synchronous rectifier circuits. In one example, a circuit includes a conduction detector configured to monitor conduction of a body diode of a synchronous rectifier switch relative to a predetermined threshold and to generate a detector output that indicates conduction or non-conduction of the body diode. A window analyzer is configured to generate a timing signal to indicate if the synchronous rectifier switch is turned off prematurely or turned off late relative to an on-time turn off based on the detector output from the conduction detector. A controller is configured to adjust the timing of the synchronous rectifier switch based on whether the timing signal indicates that the synchronous rectifier switch is turned off prematurely or turned off late relative to the on-time turn off.

In another example, a synchronous rectifier circuit includes a synchronous rectifier switch having a body diode to rectify voltages from a secondary winding of a transformer. A conduction detector is configured to monitor conduction of the body diode of the synchronous rectifier switch relative to a predetermined threshold and to generate a detector output that indicates conduction or non-conduction of the body diode. A window analyzer is configured to generate a timing signal to indicate if the synchronous rectifier switch is turned off prematurely or turned off late relative to an on-time turn off based on the detector output from the conduction detector. A controller is configured to adjust the timing of at least one of activation and deactivation of the synchronous rectifier switch based on the timing signal. The controller can be configured to advance the timing if the timing signal indicates that the synchronous rectifier switch is turned off early and the controller can be configured to delay the timing if the timing signal indicates that the synchronous rectifier switch turned off late relative to the on-time turn off.

In yet another example, an integrated circuit includes a conduction detector configured to monitor conduction of a body diode of a synchronous rectifier switch relative to a predetermined threshold and to generate a detector output that indicates conduction or non-conduction of the body diode. A window analyzer is configured to provide a timing signal to indicate if the synchronous rectifier switch is turned off early or turned off late based on a clamp signal and based on the detector output from the conduction detector. A controller is configured to adjust the timing of the synchronous rectifier switch via a rectifier drive signal based on whether the timing signal indicates that the synchronous rectifier switch is turned off prematurely or turned off late relative to the on-time turn off. An output driver controls a gate of the synchronous rectifier switch in response to the rectifier drive signal from the controller.

BRIEF DESCRIPTION OF THE DRAWINGS

FIG. 4 illustrates an example signal and timing diagram representing a clamp signal for setting a region when a synchronous rectifier switch can be turned on.

DETAILED DESCRIPTION

This disclosure relates to synchronous rectifier circuits. A synchronous rectifier circuit can be configured to monitor conduction of a body diode of a synchronous rectifier switch (e.g., a metal oxide semiconductor field effect transistor (MOSFET) or other transistor device) to adjust turn-on and turn-off timing of the switch. and thereby increase efficiency of the circuit. The synchronous rectifier circuit can provide rectification of AC signals into DC signals in the secondary side of a transformer converter circuit (e.g., LLC resonant converter). The synchronous rectifier switch can be synchronized with primary-side drive signals to turn off and turn on at the correct times to convert secondary AC signals into rectified DC signals in an efficient manner. A controller receives the primary drive signals and controls the switch.

In some examples, a conduction detector can monitor the conduction of the body diode, such as to identify conduction or non-conduction. A window analyzer can be configured to generate a timing signal to indicate if the synchronous rectifier switch is turned off prematurely or turned off late relative to an on-time turn off based on the detector output from the conduction detector. If conduction is detected due to the switch being turned off too early or too late in the previous period, the controller can then adjust the timing to switch (e.g., switch on and/or off times) to mitigate the body diode conduction. The controller can implement different incremental timing adjustments depending on whether it is determined that the switch turns off too early or too late. Thus, by analyzing body diode conduction for both timing conditions (e.g., whether turned off too early or too late), the synchronous rectifier circuit can be operated more efficiently than other systems (e.g., systems that merely monitor for non-conduction during a dead-time period).

Figure 1:
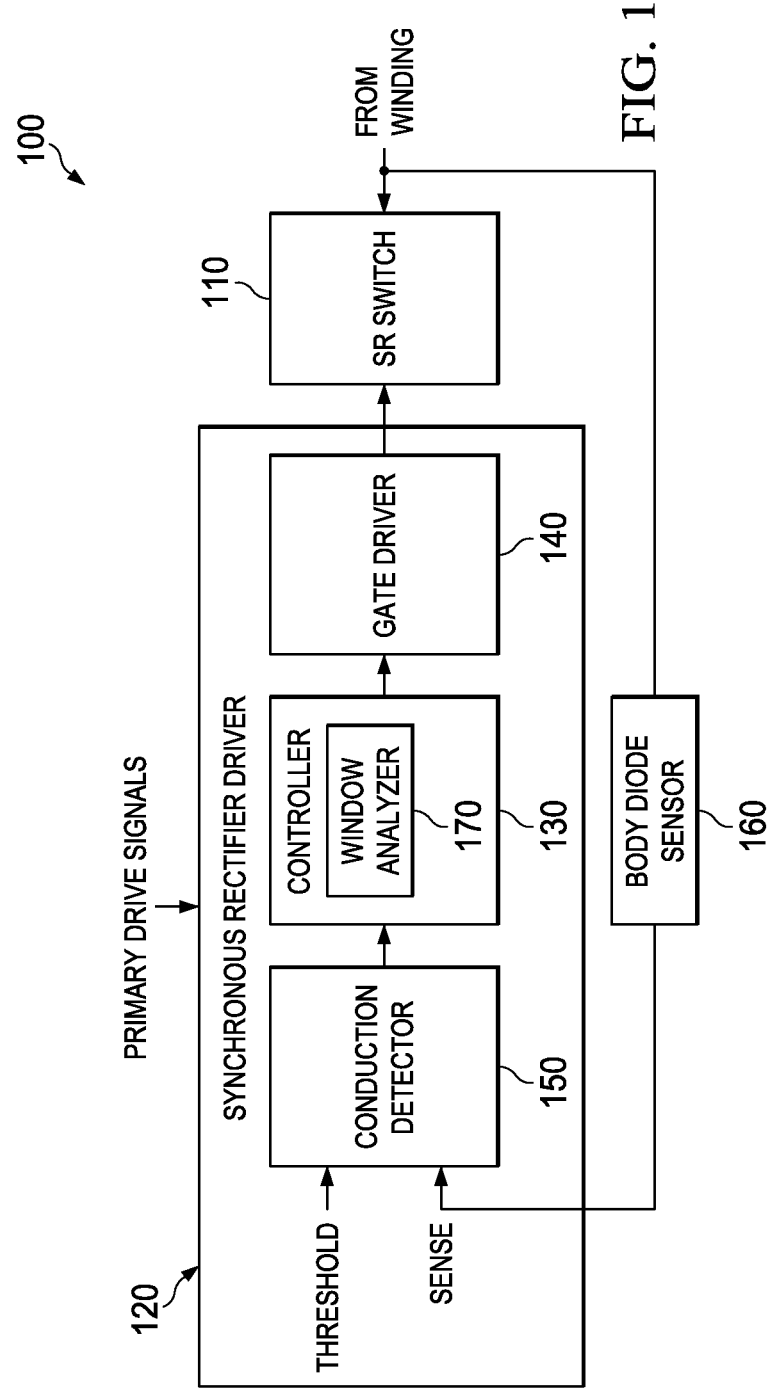
FIG. 1 illustrates an example of a block diagram of a synchronous rectifier control circuit that monitors a body diode of a synchronous rectifier switch and automatically adjusts switch timing based on conduction or non-conduction of the body diode.

FIG. 1 illustrates an example of a synchronous rectifier (SR) circuit 100 that can automatically adjust switch timing (e.g., turn on and/or turn off) based on conduction of an internal body diode of a corresponding synchronous rectifier (SR) switch 110. For example, the SR switch 110 can be implemented as a power MOSFET device or other power transistor device (e.g., bipolar junction transistor) that is operated as a switch between on and off states. The synchronous rectifier switch 110 rectifies voltages received from a secondary winding of a transformer. For example, such winding is from an LLC resonant converter winding, where LL represents leakage and series inductance of the primary winding and C represents capacitance in the winding. The SR circuit 100 includes a synchronous rectifier (SR) driver 120 to control turn-off and turn-on of the SR switch 110. As shown, the SR driver 120 can be synchronized for switch turn-on/turn-off via primary drive signals that also drive the primary side of the transformer which is shown below with respect to FIG. 3.

In the example of FIG. 1, the SR driver 120 includes a controller 130 that is configured to receive the primary drive signals. The controller 130 generates a rectifier drive signal to control a gate driver 140 that controls the SR switch 110 based on the primary drive signals. The SR driver 120 also includes a conduction detector 150 configured to monitor conduction of the body diode of the SR switch 110 relative to a predetermined threshold and to generate a detector output that indicates conduction or non-conduction of the body diode. In one example, the predetermined threshold can be set as a voltage input to the conduction detector 150 such as 0.1V but other settings are possible. The conduction detector 150, can be a comparator in one example, generates a detector output to the controller 130 that indicates conduction or non-conduction of the body diode in the SR switch 110. A sense input to the conduction detector 150 is received from a body diode sensor 160 (e.g., sense resistor input to comparator) that senses the drain-to-source voltage (VDS) of the SR switch 110 to provide a sensor signal (e.g., a voltage signal) indicating body diode conduction.

A window analyzer 170 can be configured to generate a timing signal to indicate if the synchronous rectifier switch is turned off prematurely or turned off late relative to an on-time turn off based on the detector output from the conduction detector 150. While the window analyzer 170 is demonstrated as part of the control in the example of FIG. 1, it could alternatively be implemented separate from the controller 130. As used herein in the context of body diode conduction, the term window refers to a time period when body diode conduction is analyzed. For example, the window can include a period of time before and after a desired turn-on or turn-off time for the switch 110. The window analyzer 170 can be configured for analyzing internal signals, such as an internal clamp signal that is generated as a function of the primary drive signals and the rectifier drive signal from the controller 130. The window analyzer thus can analyze leading and trailing edges of internal and/or external signals corresponding to body diode conduction to determine whether or not the SR switch 110 has been turned off too early or too late. As will be described below, other window analyzer operations can be provided, such as a window operation to determine whether diode conduction has occurred in a given time frame or with respect to a given signal or signal edge, for example. A window function can be provided to determine a measurement window to facilitate a determination of whether or not the SR switch 110 has been turned on and/or off at the appropriate times.

If the window analyzer 170 determines that the SR switch 110 was turned off too early or too late, the controller 130 adjusts the timing of at least one edge of the rectifier drive signal to the gate driver 140 based on the timing window and the detector output indicating conduction of the body diode from a previous time period. For example, two different conditions are detected by the window analyzer 170. A first condition analyzes whether the SR has turned off too early and a second condition analyzes whether the switch has turned off too late relative to the on-time turn-off condition. If the SR switch 110 has turned off too early, the timing to the switch can be delayed (e.g., switch on-time adjusted longer) at the next switching cycle. If the SR switch 110 has turned off too late as determined by the window analyzer 170, the timing to the switch can be advanced (e.g., switch on-time adjusted shorter) at the next switching cycle.

Testing and adjusting for both the too early and the too late conditions is in contrast to some existing systems that merely monitor the output from the conduction detector 150 for non-conduction during the off-time (e.g., dead-time) of the SR switch 110. Since such systems do not monitor for both the turn-off early condition and the turn-off late condition of the SR switch 110, as provided by the window analyzer 170, efficiency of such conventional systems can suffer. In contrast, the controller 130 and window analyzer 170 can auto-tune the timing to the gate driver 140 to maximize overall circuit efficiency in one direction or another depending on the detected conduction of the body diode and timing related thereto. Such window analysis also facilitates improved reaction to transient conditions over conventional systems.

The controller 130 can generate an internal clamp signal based on at least one of the primary drive signals that represents a time period when the synchronous rectifier switch can be turned on. In one example, the controller 130 can generate a phase shift (e.g., additional time increments added to the end of a timing cycle to adjust for body diode conduction) that is added to the end of the internal clamp signal to adjust for positive current flow after the synchronous rectifier switch 110 is turned off. The window analyzer 170 can employ the timing signal in relation to the internal clamp signal to detect if the synchronous rectifier switch was turned off too early or turned off too late to facilitate timing adjustment of at least one edge of the rectifier drive signal (also referred to as SR_IN). The window analyzer 170 can also include a window function to determine an amount of time the body diode is in conduction based on the internal clamp signal to facilitate timing adjustment of the at least one edge of the rectifier drive signal. By determining the total diode conduction time in relation to the clamp signal, a determination can be made as to whether or not to advance or delay the timing signal during the next cycle.

The synchronous rectifier driver 120 can include a window signal input (See FIG. 2) to the controller 130 to adjust the timing signal. In one example, the timing signal can be adjusted by the window signal input to the controller in a range of about 80 nanoseconds to about 800 microseconds. In another example, the controller can adjust the timing of at least one edge of the rectifier drive signal in programmable on time increments and off time increments. For example, the programmable on time increments can be about five times that of the off time increments (e.g., 3 nanoseconds on-time and the programmable off time increments can be about 25 microseconds). The controller 130, gate driver 140, the conduction detector 150, and the window analyzer 170 can be configured to control a resonant LLC DC/DC converter. Such converter configurations can include a half-bridge LLC converter, a full-bridge LLC converter, or half-bridge LLC converter with pulse-width modulated (PWM) mode.

In one example, the circuit 100 can be provided as a circuit (e.g., integrated circuit, discrete circuit, combination of integrated circuit and discrete circuits) for synchronous rectification. Discrete control elements can be provided within the various circuits, for example. It is noted that the examples described herein can be provided via different analog and/or digital circuit implementations. For instance, in some cases, field effect transistors can be employed and in other cases junction transistors or diodes employed. The circuit 100 can employ various means of monitoring electrical parameters such as monitoring voltage and/or current. This can also include generating voltage and/or current control signals as described herein. In some examples, hard-wired logic can perform the functions and operations performed herein. In other examples, software can be executed such as by the controller 130, for example. In yet other examples, a combination of hard-wired logic and software can be employed.

Figure 2:
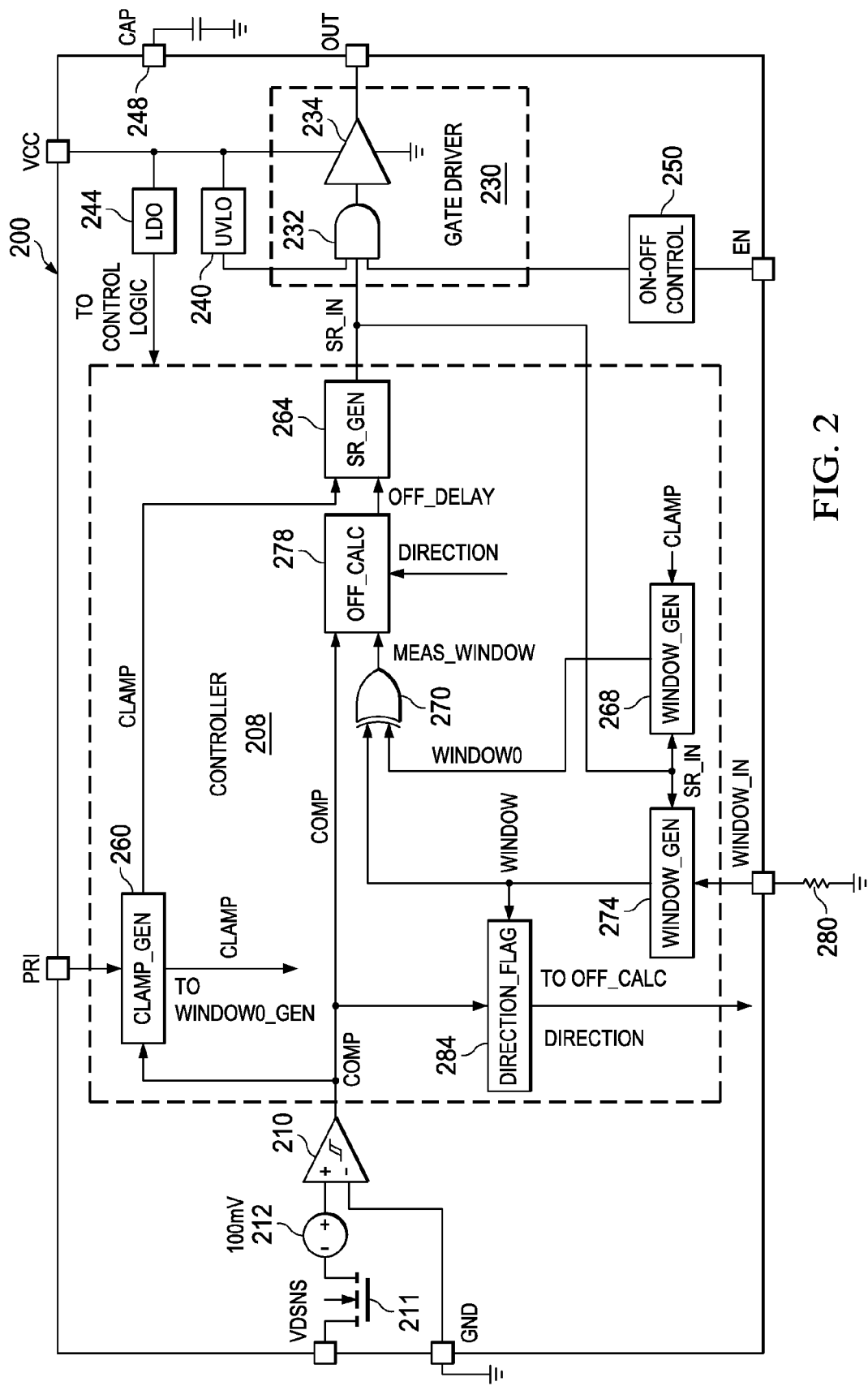
FIG. 2 illustrates an example of an integrated circuit synchronous rectifier driver that monitors a body diode of a synchronous rectifier switch and automatically adjusts switch timing based on conduction or non-conduction of the body diode

FIG. 2 illustrates an example of an integrated circuit synchronous rectifier (SR) driver 200. The SR driver 200 is configured to monitor a body diode of a synchronous rectifier switch and automatically adjust switch timing based on conduction timing of the body diode. The SR driver 200 has various inputs and outputs that can be interfaced with the circuit 100 described with respect to FIG. 1. Input PRI is the primary side gate control signal input. An external digital controller (See main controller 910 of FIG. 9) can provide a digital input for the PRI pin. The PRI should be connected to the corresponding primary side drive signal. A controller 208 utilizes the PRI input signal in conjunction with a COMP signal received from a comparator 210. The comparator 210 receives a VDSNS signal via sensor 211 in relation to an internal reference 212 (e.g., 100 mv) which is monitored with respect to a ground input (GND).

The signal VDSNS represents a body diode sense signal input supplied from a body diode sensor, such as a resistor connected to the drain of an SR switch. The controller 208 generates an SR_IN signal which is an SR gate drive signal input to a gate driver 230. Output (OUT) from the gate driver 230 can be connected to control a gate input to an SR switch (e.g., the SR switch 110 of FIG. 1). As shown, the gate driver 230 can include a logic control gate 232 and power driver 234. A UVLO circuit 240 operates as an under-voltage threshold that can set a threshold voltage to prevent the gate driver 230 from operating until the input power VCC has reached a minimum threshold. A local device oscillator 244 supplies a clock timing reference for the controller 208. A capacitor input 248 enables oscillation of the local device oscillator 244. An enable input (EN) can be utilized to enable or disable the gate driver 230 via an on/off control 250 and logic gate 232.

As shown, the controller 208 includes a clamp generator 260 which generates a CLAMP timing signal for an SR_GEN block 264 and a window function generator (WINDOW0_GEN) 268. Output from the window function generator 268 (WINDOW0) is logically ORed via gate 270 with a window signal (WINDOW) generated by a window generator 274. Output from gate 270 generates a timing measurement window (MEAS_WINDOW) for an OFF-CALC block 278 that determines an OFF_DELAY signal that is employed by the SR_GEN 264 to control the on/off timing of the SR switch via gate driver 230. A window input pin (WINDOW_IN) can receive a signal to set a window width parameter for the window generator 274 via an external resistor 280. The OFF-CALC block 278 employs the MEAS_WINDOW output from gate 270 in conjunction with the comparator output COMP to set the OFF_DELAY signal for the SR_GEN block 264. A direction block 284 generates a direction flag (DIRECTION) for the OFF_CALC block 278 to facilitate determination of which direction in which to adjust the timing for the SR switch. The direction block 284 receives the COMP output from the comparator 210 along with the WINDOW signal 274 to determine the direction for timing adjustment.

FIGS. 3-8 are provided to illustrate example timing and signal operations of the circuit depicted in FIG. 2. Thus, FIGS. 3-8 will be discussed in context and with reference to FIG. 2. Other timing and signal relationships from the examples shown in FIGS. 3-10 are also possible. The inputs PRI and the comparator output COMP of FIG. 2 define the region in which the synchronous rectifier (SR) can be turned on. This region is referred to as "CLAMP", and it is an internal signal. When the clamp is high, the SR can be turned on. The actual turn on and off time are not determined by clamp. The SR turns on when the body diode starts conducting after PRI input goes high. The SR turn-off time is determined by either the body diode conduction time of the previous period, or CLAMP going low.

The length of SR turning on is auto-tuned base on the body diode conduction time of the previous period. If the measured body diode conduction time is less than the threshold setting, then, in the next cycle the SR on time can be increased; if the measured body diode conduction time is greater than the threshold setting, then, in the next cycle the SR on time can be decreased. The PRI input is the primary side gate control signal input. The digital controller (See FIG. 9) on the secondary side can provide digital input for PRI pin. The PRI should be connected to the corresponding primary side drive signal.

Figure 3:
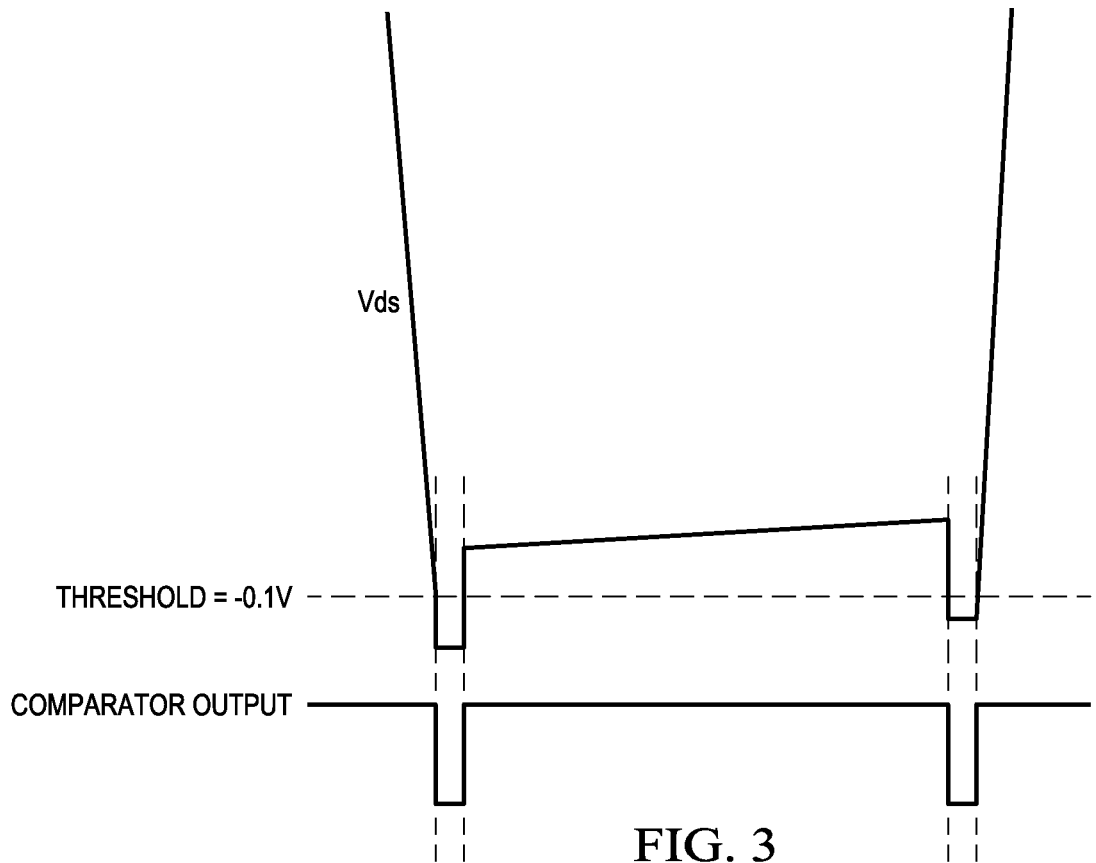
FIG. 3 illustrates an example signal diagram representing body diode conduction sensing.

As shown in FIG. 3, the diode conduction time can be sensed through drain-to-source voltage. The drain of the MOSFET can be connected to VDSNS pin of FIG. 2, which is internally connected to the comparator 210. The comparator output COMP goes low when body diode conducts. A benefit of sensing diode conduction is that the body diode voltage drop is relatively consistent over the load range; and different MOSFETs have similar body diode voltage drop as well.

Figure 4:
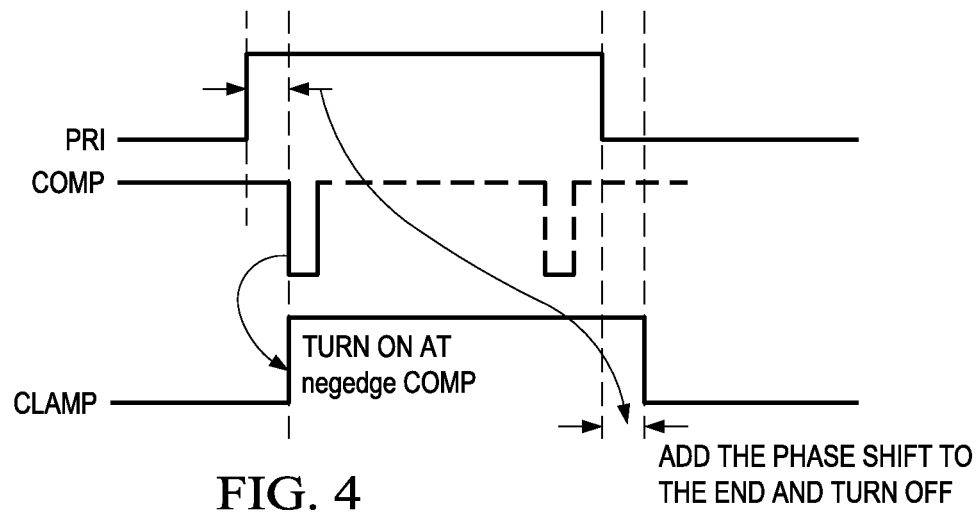

The CLAMP output signal from the clamp generator 210 defines a region when the SR is allowed to be turned on. The SR on time should not go beyond CLAMP. The CLAMP signal is generated as a function of PRI and COMP as shown in FIG. 4. The CLAMP goes high and the body diode conduction measurement interval begins when PRI goes high. The measurement interval ends when the COMP signal from comparator 210 goes low. The CLAMP goes low by a delay equaling the measurement interval. One reason why this time measurement is needed is that when the converter operates well above its resonant frequency, there is usually some amount of phase shift between resonant current and the current on the secondary. It is possible that after primary side gate drive signal goes low, there is may still be some amount of positive current flow. Thus, this phase shift can be measured and added to the end of the clamp period for example.

Figure 5:
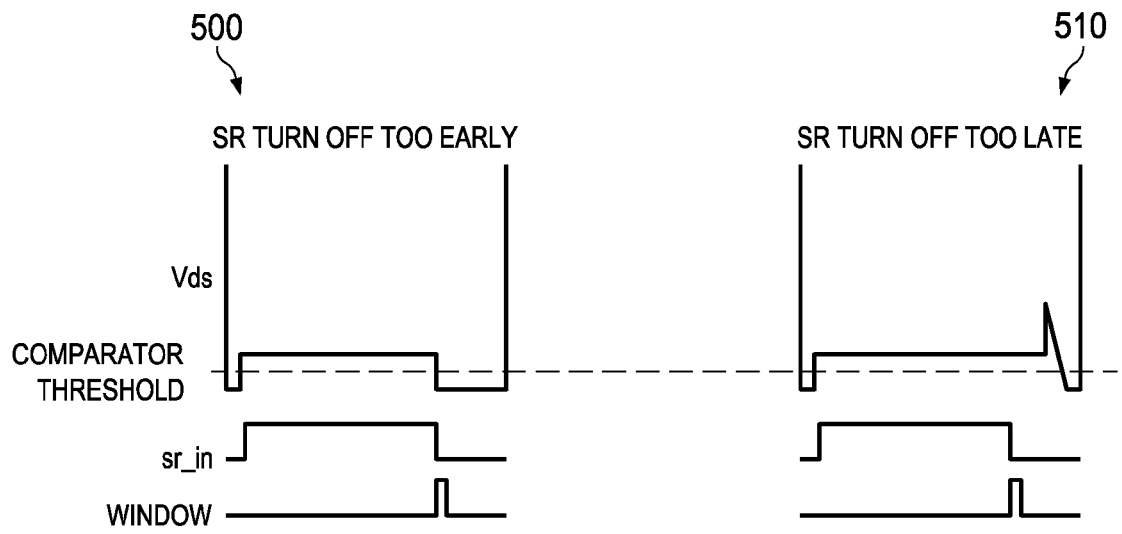
FIG. 5 illustrates an example signal and timing diagram representing two conditions for body diode conduction.

Referring to FIG. 5, there are two cases when the body diode of the SR MOSFET conducts. In a first case illustrated at 500, the MOSFET turns off too early, positive current flows, and the body diode conducts. In the second case illustrated at 510, the MOSFET turns off too late, negative current flows, and body diode reverse recovery cause conduction. In the two cases, the SR on time should be adjusted in different directions, thus the conditions should be detected differently from each other. A decision making window is generated for this purpose. Thus, in both cases, the body diode conducts, but conducts at different times. At 510 of FIG. 5, the body diode conducts right after the SR turns off. In Case 2, the VDS first shoots up, and then the body diode conducts due to reverse recovery. The actual SR turn off time is after the SR_IN signal of FIG. 2 goes low due to the gate resistance and capacitance of the MOSFET and the circuits near it. Thus, a decision making window can be set to tell these two cases apart.

The decision making window length setting can be based on the MOSFET gate capacitance and resistance, and the system voltage level—these values can be obtained from MOSFET datasheet, for example. The window length setting should be slightly longer than the calculated SR turn off delay. For example, if the turn off delay of MOSFET is 250 ns, then the decision making window can be set to 300 ns, for example. Thus, in the last 50 ns of the window, diode conduction can be sensed by the comparator 210 of FIG. 2; if it is the second condition, within the range of decision making window, there should be no body diode conduction.

Figure 6:
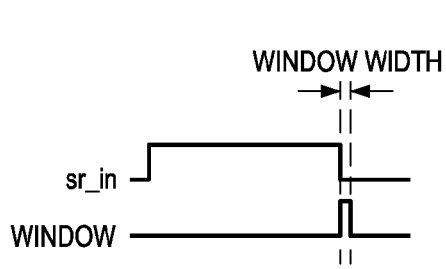
FIG. 6 illustrates an example signal and timing diagram representing a window signal for measuring body diode conduction.

The decision making window generation will now be described with reference to FIG. 6. The inputs of the WINDOW_GEN block 274 of FIG. 2 are SR_IN signal and WINDOW_WIDTH provided by resistor 280 with the output being WINDOW. As shown in FIG. 6, WINDOW goes high at the falling edge of SR_IN, and stays high for WINDOW_WIDTH, and then goes low. In addition to the WINDOW signal, a WINDOW function signal is generated by the WINDOW0 generator 268 of FIG. 2. The SR on time can be adjusted based on the body diode conduction time of the previous cycle.

Figure 7:
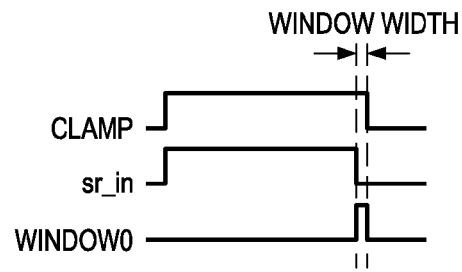
FIG. 7 illustrates an example signal and timing diagram representing a window function signal for measuring body diode conduction.

In addition to the decision making window depicted in FIG. 6, a longer window is utilized to record the total body diode conduction time. Here, the signal WINDOW0 is generated as shown in FIG. 7. The signal WINDOW0 goes high at the falling edge of SR_IN, and goes low at the falling edge of clamp, as shown in FIG. 7. If the SR_IN is cut-off by CLAMP, the WINDOW0 can be set at 0. The MEAS_WINDOW output from the gate 270 of FIG. 2 is the time period to measure total body diode conduction time. The MEAS_WINDOW is generated by ORing WINDOW and WINDOW0. In the MEAS_WINDOW time period, total COMP low time measurement is enabled.

The WINDOW and COMP signals of FIG. 2 are also used to generate the DIRECTION flag. If during the WINDOW time period, and COMP is detected high, DIRECTION=0, meaning SR on time is too long. If during the WINDOW period there is a COMP low detected, and the total body diode conduction time is greater than the threshold setting (e.g., threshold is in the range of 1 to 32 times of the minimum step size), the DIRECTION=1, meaning SR on time is too short. If during the WINDOW time period, there is COMP low detected and total body diode conduction time is less than threshold setting, DIRECTION=2, meaning SR on time is suitable (e.g., not too early or too late).

The OFF-CALC block 278 of FIG. 2 calculates the desired SR on time for the next switching cycle. The input of this block is MEAS_WINDOW, COMP, and DIRECTION; the output is OFF_DELAY. The OFF_DELAY is the length of SR on time if SR pulse is not cut off by CLAMP. It can be set initially at 130 ns, for example, and the minimal OFF_DELAY is 130 ns. When MEAS_WINDOW is high, COMP measurement is enabled. Then, measure the time interval that COMP is low during the MEAS_WINDOW which is COMPLOW. If DIRECTION=0, decrease OFF_DELAY by a predetermined step size (e.g., in the range of 1 to 64 times of the minimum step size). But do not decrease it below 130 ns (or other predetermined value). If DIRECTION=1, increment OFF_DELAY by COMPLOW/2. If DIRECTION=2, keep OFF_DELAY at the previous setting.

The SR generator block 264 of FIG. 2 generates SR_IN, which is the input of the gate driver block 230. The SR_IN goes high when CLAMP goes high. Timeout count begins when the SR_IN is high. The SR_IN goes low when either timeout count is reached at OFF_DELAY or CLAMP goes low. The timeout resolution is clock period. The SR on-time adjustment step size can be 3 ns (or other predetermined value) with ±50% tolerance. The maximum time length for the "off delay" register/capacitor can be 25 us (or other predetermined value).

Figure 8:
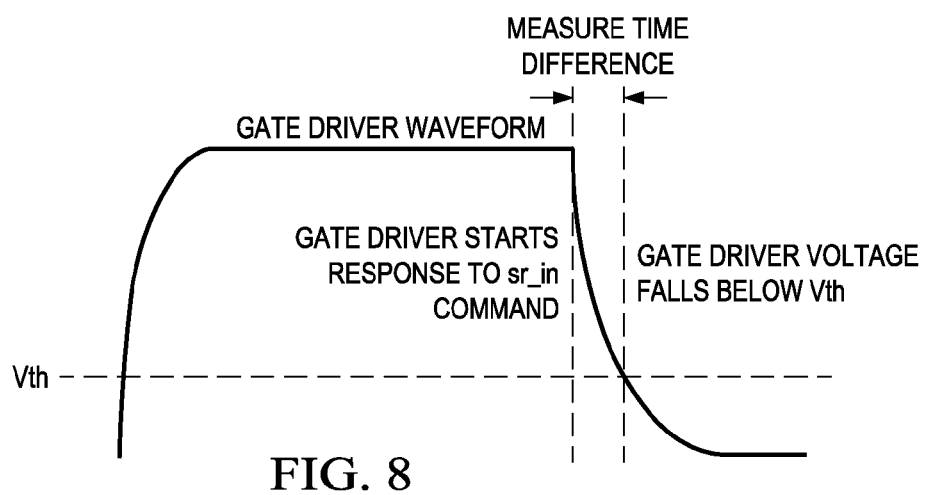
FIG. 8 illustrates an example gate driver signal for controlling a synchronous rectifier switch.

The length of decision making window should be properly set to mitigate body diode conduction time and facilitate efficient SR operation. The length should be about 20~30% longer than the time from the gate driver starting to response to SR_IN command to the gate drive signal falls to Vth as shown in FIG. 8. The time from SR_IN command to the gate drive signal falls to Vth is about 230 ns from FIG. 8. The decision making window can be set to about 300 ns (or other predetermined value). This time can also be calculated based on datasheet parameters. Window size can be adjusted from about 80 ns to about 800 ns, for example.

Figure 9:
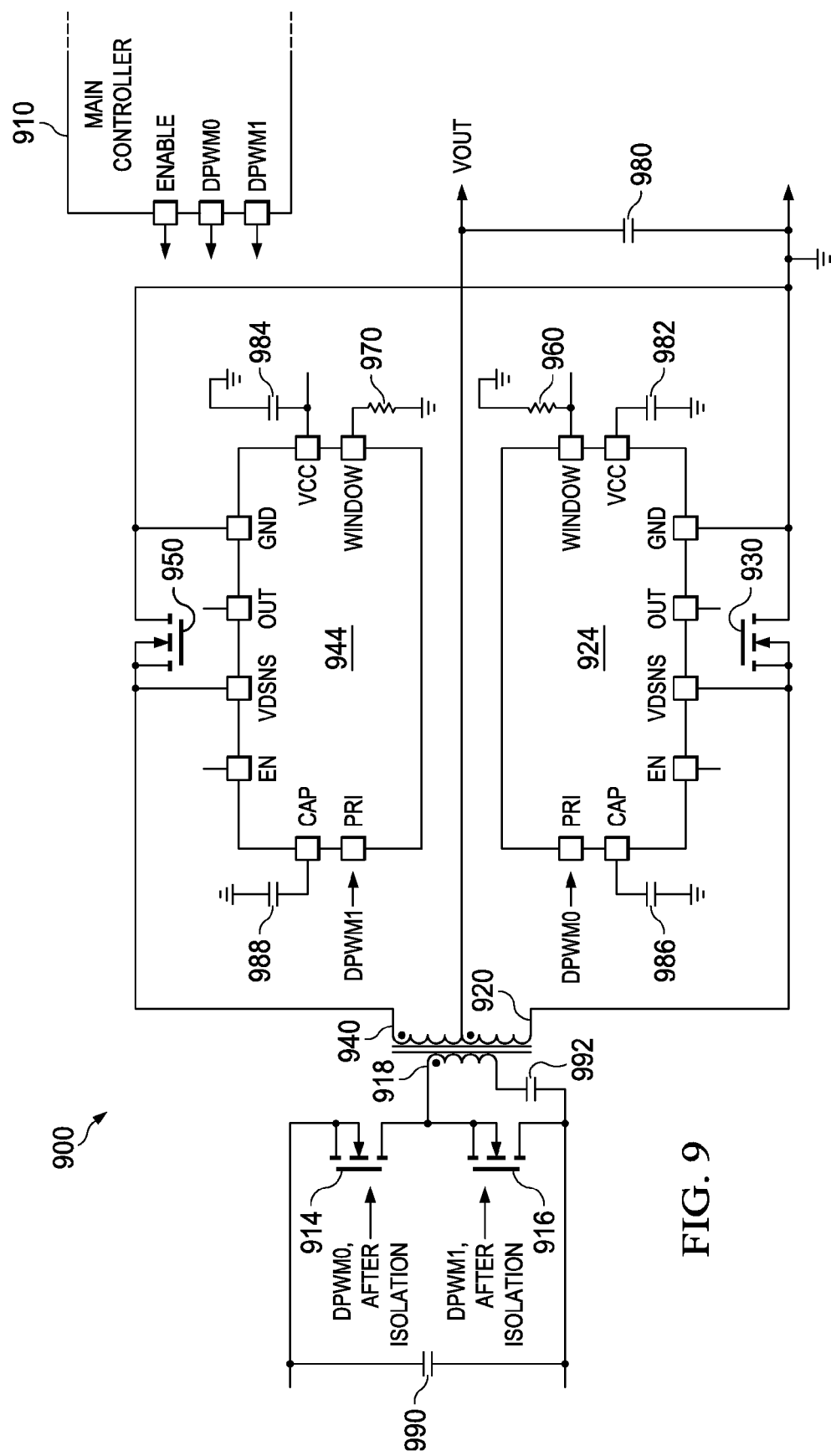
FIG. 9 illustrates an example LLC resonant converter circuit that employs an integrated circuit synchronous rectifier driver to monitor a body diode of a synchronous rectifier switch and adjust switch timing based on conduction or non-conduction of the body diode.

FIG. 9 illustrates an example LLC resonant converter application circuit 900 that employs an integrated circuit SR driver. The SR driver is configured to monitor conduction of a body diode of a synchronous rectifier switch and automatically adjusts switch timing based on conduction or non-conduction of the body diode. The circuit 900 includes a digital controller 910 to generate primary drive signals DPWM0 and DPWM1. The primary drive signals drive switches 914 and 916, which in turn drive a transformer primary 918. A transformer secondary is connected in a half-bridge configuration with a lower winding 920 being rectified by SR switch driver 924 and SR switch 930. An upper secondary portion 940 is rectified by SR switch driver 944 and switch 950. The primary drive signals DPWM0 and DPWM1 also drive the SR drivers 924 and 944 to enable synchronous turn-on and turn-off of SR switches 930 and 950, respectively.

Resistors 960 and 970 provide program information for the period of the timing signal described above. For example, the resistors 960 and 970 can be configured to set the window width period described above. Various capacitors 980, 982, 984, 986, 988, 990, and 992 can be placed at various locations in the circuit 300 for filtering and/or timing adjustment. Output from the circuit 900 is shown as Vout and represents a DC voltage, for example. As noted previously, other resonant converter configurations are possible such as a full-wave configuration where four sets of SR drivers and switches would be configured as a full-wave rectifier bridge in the secondary. Yet another configuration could include a full-bridge application where four switches drive the primary side in a push-pull configuration, for example.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A circuit comprising:
    a conduction detector configured to monitor conduction of a body diode of a synchronous rectifier switch relative to a predetermined threshold and to generate a detector output that indicates conduction or non-conduction of the body diode; and
    a window analyzer configured to generate a timing signal based on the detector output from the conduction detector, the timing signal indicating if the synchronous rectifier switch is turned off prematurely or is turned off late relative to an on-time turn off; and
    a controller configured to adjust timing of the synchronous rectifier switch based on whether the timing signal indicates that the synchronous rectifier switch is turned off prematurely or turned off late relative to the on-time turn off.

2. The circuit of claim 1, wherein the controller generates an internal clamp signal that indicates the on-time turn off based on at least one primary drive signal, the internal clamp signal representing a time period when the synchronous rectifier switch can be turned on.

3. The circuit of claim 2, wherein the window analyzer determines a phase shift that is added to an end of the internal clamp signal by the controller to adjust for positive current flow after the synchronous rectifier switch is turned off.

4. The circuit of claim 2, wherein the window analyzer employs the timing signal in relation to the internal clamp signal to detect if the synchronous rectifier switch was turned off prematurely or turned off late relative to the on-time turn off of the synchronous rectifier switch.

5. The circuit of claim 4, wherein the window analyzer further comprises a window function to determine an amount of time that the body diode is in conduction based on the internal clamp signal to facilitate a timing adjustment by the controller.

6. The circuit of claim 4, further comprising a window signal input pin to the controller to enable an external programming adjustment of the timing signal.

7. The circuit of claim 6, wherein the timing signal is adjusted via the window signal input pin to the controller in a range of about 80 nanoseconds to about 800 microseconds.

8. The circuit of claim 1, wherein the controller is configured to adjust the timing of the synchronous rectifier switch in programmable on-time increments based on a parameter configuration block and is configured to adjust the timing of the synchronous rectifier switch in programmable off-time increments based on the parameter configuration block.

9. The circuit of claim 8, wherein the programmable off-time increments are about five times greater than the programmable on-time increments.

10. The circuit of claim 1, wherein the controller, the conduction detector, and the window analyzer are configured to control a resonant LLC DC/DC converter.

11. The circuit of claim 10, wherein the resonant LLC DC/DC converter is configured as a half-bridge LLC converter or a full-bridge LLC converter.

12. The circuit of claim 1, wherein the conduction detector comprises a comparator configured to monitor a signal representing conduction of the body diode of the synchronous rectifier switch relative to the predetermined threshold.

13. A synchronous rectifier circuit comprising:
    a synchronous rectifier switch having a body diode to rectify voltages from a secondary winding of a transformer;
    a conduction detector configured to monitor conduction of the body diode of the synchronous rectifier switch relative to a predetermined threshold and to generate a detector output that indicates conduction or non-conduction of the body diode;
    a window analyzer configured to generate a timing signal to indicate if the synchronous rectifier switch is turned off prematurely or turned off late relative to an on-time turn off based on the detector output from the conduction detector; and
    a controller configured to adjust timing of at least one of activation and deactivation of the synchronous rectifier switch based on the timing signal, the controller configured to advance the timing if the timing signal indicates that the synchronous rectifier switch is turned off early and the controller configured to delay the timing if the timing signal indicates that the synchronous rectifier switch turned off late relative to the on-time turn off.

14. The synchronous rectifier circuit of claim 13, wherein the controller is configured to generate a clamp signal based on at least one primary drive signal that represents a time period when the synchronous rectifier switch can be turned on.

15. The synchronous rectifier circuit of claim 14, wherein the controller generates the timing signal in relation to the clamp signal to determine if the synchronous rectifier switch was turned off too early or turned off too late to facilitate timing adjustment of the synchronous rectifier switch.

16. The synchronous rectifier circuit of claim 15, further comprising a window function to determine an amount of time the body diode is in conduction based on the clamp signal to facilitate timing adjustment of the at least one edge of the synchronous rectifier switch.

17. The synchronous rectifier circuit of claim 13, further comprising a window signal input pin to the controller to enable an external programming adjustment of the timing signal.

18. The synchronous rectifier circuit of claim 13, wherein the controller adjusts the timing of the at least one edge of the synchronous rectifier switch in programmable on-time increments and off-time increments based on an input from a parameter block.

19. An integrated circuit comprising:
    a conduction detector configured to monitor conduction of a body diode of a synchronous rectifier switch relative to a predetermined threshold and to generate a detector output that indicates conduction or non-conduction of the body diode;
    a window analyzer configured to provide a timing signal to indicate if the synchronous rectifier switch is turned off early or turned off late based on a clamp signal and based on the detector output from the conduction detector;

a controller configured to adjust timing of the synchronous rectifier switch via a rectifier drive signal based on whether the timing signal indicates that the synchronous rectifier switch is turned off early or turned off late relative to on-time turn off; and an output driver to control a gate of the synchronous rectifier switch in response to the rectifier drive signal from the controller.

20. The integrated circuit of claim 19, wherein the controller adjusts timing of the at least one edge of the rectifier drive signal in programmable on-time increments and off-time increments based on the timing signal.

* * * * *